United States Patent [19]

Tanaglia

[11] Patent Number: 5,780,570
[45] Date of Patent: Jul. 14, 1998

[54] PROCESS FOR THE PREPARATION OF POLYMERIC MIXTURES BASED ON EP (D) M ELASTOMER COPOLYMERS

[75] Inventor: Tiziano Tanaglia, Bologna, Italy

[73] Assignee: Enichem S.p.A., Milan, Italy

[21] Appl. No.: 826,423

[22] Filed: Mar. 27, 1997

[30] Foreign Application Priority Data

Apr. 11, 1996 [IT] Italy ................. MI96A0692

[51] Int. Cl.$^6$ .................. C08F 4/68; C08F 2/14
[52] U.S. Cl. .................. 526/86; 526/79; 526/87; 526/143; 526/144; 526/169.2; 526/339; 526/904; 526/905; 525/270; 525/322; 525/324
[58] Field of Search .................. 526/66, 86, 87, 526/143, 144, 169.2, 79, 88; 525/270, 322, 324

[56] References Cited

U.S. PATENT DOCUMENTS

| | | |
|---|---|---|
| 4,078,131 | 3/1978 | de Zarauz ................. 526/143 |
| 5,082,908 | 1/1992 | Imai et al. ................. 526/143 |
| 5,374,695 | 12/1994 | Tanaglia et al. |
| 5,491,208 | 2/1996 | Tanaglia et al. |
| 5,516,862 | 5/1996 | Yamamoto et al. ................. 526/143 |

*Primary Examiner*—Fred Teskin
*Attorney, Agent, or Firm*—Oblon, Spivak, McClelland, Maier & Neustadt, P.C.

[57] ABSTRACT

Process with two or more steps for the preparation in suspension of mixtures of ethylene-propylene (EPM) elastomer homopolymers or ethylene-propylene-diene (EPDM) elastomer terpolymers in the presence of a catalytic system essentially consisting of a compound of Vanadium and a cocatalyst essentially consisting of an Aluminum alkyl and in the presence of an activator, the above process being characterized in that:

a) in the first step a first polymerization of the monomers is carried out in the presence of the Vanadium based catalyst;

b) in the second or subsequent steps further polymerizable monomers and activator are added to the suspension of the polymer obtained in step (a).

15 Claims, 1 Drawing Sheet

PROCESS FOR THE PREPARATION OF POLYMERIC MIXTURES BASED ON EP (D) M ELASTOMER COPOLYMERS

The present invention relates to a process for the preparation of elastomer mixtures of copolymers and terpolymers of ethylene and propylene.

More specifically, the present invention relates to a process for obtaining bimodal ethylene/propylene and ethylene/propylene/diene elastomers directly in the polymerization reaction.

Bistep (or multistep) processes are known in literature for the synthesis of bimodal products; in the case of polyethylene these processes exploit the high lifetime of the catalysts to have the possibility of obtaining polymers with different molecular weights in the various steps (see for example EP-A-057420 and EP-A-649860).

The above system is effective in the field of plastic materials but cannot be applied to processes in suspension for the production of elastomer (co) and (ter)polymers, as the typical catalysts for this process could not guarantee the elastomeric properties typical of EP(D)M.

Other patents exist in which products with a wide molecular weight distribution or bimodal products are obtained in a single reactor with the use of catalysts based on various transition metals (U.S. Pat. No. 5,401,816; U.S. Pat. No. 5,399,540; EP-A-480,376) or containing different salts of the same metal (EP-A-314.165).

This type of process does not enable the compositions of the polymers generated by the various catalytic sites to be independently controlled. For this reason, the above patents also mainly relate to plastic materials, in which the predominant presence of a component makes the composition distribution have little influence on the characteristics of the product.

It is also known that, with respect to the process for the production of ethylene-propylene elastomers in suspension, a process which is preferable for its low cost, high productivity and reduced environmental impact, the catalytic system traditionally used is based on Vanadium salts. At normal operating temperatures, this catalytic system has a high deactivation rate which does not allow a bistep-type process to be economically and technically satisfactory. In addition the slurry of the elastomer polymer in an irregular form creates typical problems of fouling-stickiness so that the transfer phases of the polymeric slurry from one reactor to another can be very critical.

It is also known that blends subsequently obtained in the processing phase, as well as causing increases in operating costs, do not have such completely homogenised polymeric phases, as in the case of a blend obtained in polymerization.

In EP-A-717,050 and EP-A-751,155 filed by the same applicant, supported and/or prepolymerized catalysts based on Vanadium are described, capable of producing ethylene-propylene elastomers (co and ter polymers) in a subdivided form with a controlled morphology in heterogeneous processes, preferably of the suspension type, thus reducing fouling of the polymerization reactor.

A process has now been found which enables the production of the above elastomer polymeric mixtures directly in the polymerization environment without the disadvantages described above.

In accordance with this, the present invention relates to a process with two or more steps for the preparation in suspension of mixtures of ethylene-propylene (EPM) elastomer homopolymers or ethylene-propylene-diene (EPDM) elastomer terpolymers in the presence of a catalytic system essentially consisting of a compound of Vanadium, as such or supported on an inert carrier, and a cocatalyst essentially consisting of an Aluminum alkyl having the general formula $R_nAlX_m$ wherein R is a $C_1$–$C_{20}$ alkyl radical, X is a halogen, $m+n=3$, m is an integer from 0 to 2, and in the presence of an activator, the above process being characterised in that:

a) in the first step a first polymerization of the monomers is carried out in the presence of the catalyst based on Vanadium, the cocatalyst and optionally in the presence of the activator, the molar ratio cocatalyst/Vanadium being from 5 to 500, preferably from 7 to 50; up to a conversion degree of at least 1000 grams of polymer per gram of Vanadium thus obtaining a suspension of the polymer in a liquid phase;

b) in the second or subsequent steps further polymerizable monomers are added to the suspension of polymer obtained in step (a) together with further activator in order to have a molar ratio between activator, sum of the optional activator of step (a) and the activator of step (b), and Vanadium of from 4 to 50; and with further cocatalyst so as to have a ratio between the cocatalyst of step (b) and Vanadium of step (a) of from 5 to 500, preferably from 7 to 50; the polymerization reaction being continued up to a conversion of at least 3000 grams of polymer per gram of catalyst.

Figure 1:
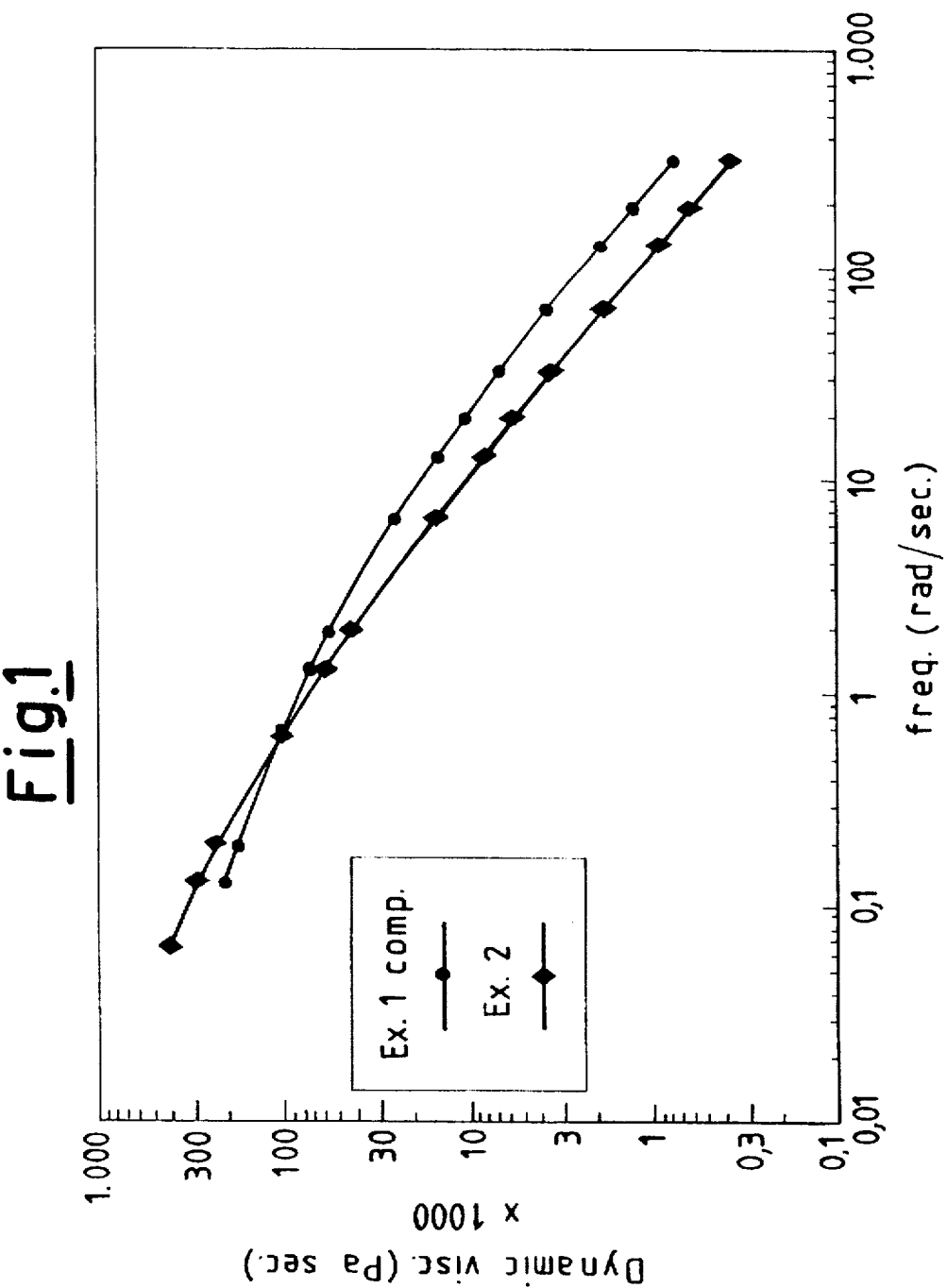
FIG. 1 is a plot of dynamic viscosity versus frequency for the polymers of Example 2 and comparative Example 1.

In the preferred embodiment, the activator is used already in step (a) in a quantity of from 1 to 10, preferably from 2 to 5, moles of activator per mole of Vanadium. Again in step (a) the molar ratio cocatalyst/Vanadium is from 5 to 500, preferably from 7 to 50.

The catalysts based on Vanadium which can be used in the process of the present invention are selected from:

supported and/or prepolymerized catalysts based on Vanadium described in EP-A-717,050 and EP-A-751, 155;

Vanadyl trihalides, alkoxyhalides and alkoxides;

Vanadium and Vanadyl acetylacetonates and chloro acetylacetonates.

In the preferred embodiment the catalyst belongs to the group of supported and/or prepolymerized catalysts based on Vanadium described in the above Italian patent applications and Vanadium and Vanadyl acetylacetonates.

As far as the activators are concerned, these are generally halogenated organic compounds of the type chloro alkanes or chloro esters such as for example $CHCl_3$, $CCl_4$, ethyltrichloroacetate or n-butylperchlorocrotonate. In the preferred embodiment the activator is ethyltrichloroacetate.

The reaction medium in which the elastomer polymer, once formed, is suspended consists of the same polymerizable monomers present in liquid phase. It is preferable however to use inert diluents, such as saturated hydrocarbons, preferably propane.

The polymerization temperature is usually between 15° C. and 65° C., preferably from 25° C. to 50° C., and the total pressure can vary from 8 to 80 bars, preferably from 12 to 40 bars.

The polymerization reaction, both in step (a) and in step (b), can be optionally carried out in the presence of a molecular weight regulator, such as diethylzinc and hydrogen, preferably hydrogen.

If hydrogen is used as molecular weight regulator, the partial hydrogen pressure in the reaction system, step (a)+ step (b), is usually from 0.2 to 20 bars, preferably from 0.5 to 10 bars. In a preferred embodiment step (a) is carried out without hydrogen, which is used instead in step (b).

As far as the reaction time of step (a) is concerned, this is usually between 10 and 180 minutes, preferably from 20 to 80 minutes; step (b) on the other hand is normally from 10 to 360 minutes, preferably from 20 to 80 minutes;

With respect to the molar ratio between ethylene and propylene in liquid phase, this can vary from 0.08 to 1, preferably from 0.11 to 0.8.

If EPDM terpolymers are desired, the third monomer is a non-conjugated diene selected from:

dienes with a linear chain such as 1,4-hexadiene and 1,6-octadiene;

branched dienes such as 5-methyl-1,4-hexadiene; 3,7-dimethyl-1,6-octadiene; 3,7-dimethyl-1,7-octadiene;

dienes with a single ring such as 1,4-cyclohexadiene; 1,5-cyclooctadiene; 1,5-cyclododecadiene;

dienes having bridge-linked rings such as methyltetrahydroindene; dicyclopentadiene; bicyclo[2.2.1]hepta2,5-2,5-diene; alkenyl, alkylidene, cycloalkenyl and cycloalkylidene norbornenes such as 5-methylene-2-norbornene; 5-ethylidene-2-norbornene (ENB); 5-propenyl-2-norbornene.

Among non-conjugated dienes typically used for preparing these copolymers, dienes containing at least one double bond in a strained ring are preferred, even more preferably 5-ethylidene-2-norbornene (ENB).

If the third monomer is used, the concentration of the latter in liquid phase can vary from 0.1 to 0.5% molar.

At the end of the process of the present invention, the polymer thus obtained can be separated with the usual techniques well known to experts in the field, for example in the form of pressed balls or in granular form, after evaporation (or stripping) of the solvent and any possible non-reacted monomers and subsequent drying.

In a preferred embodiment however, at the end of step (b) the polymer is recovered according to the process described in Italian patent applications IT-A-MI 95 1910 and IT-A-MI 95 2499.

With the process of the present invention, it is possible to directly obtain in reaction bimodal polymers resulting from the mixing of polymers with different molecular weights obtained in the various polymerization steps.

The EP(D)M polymers which can be obtained with the process of the present invention are products with a controlled morphology, having excellent elastomeric characteristics and excellent homogeneity between the phases inside the polymeric particles.

The process of the present invention also enables the composition and molecular weight of each single component to be controlled to obtain the desired characteristics.

The process as described herein refers to reactions carried out in batch, but the process can obviously be carried out in continuous, which is more advantageous from an economical point of view.

It is also evident that, depending on the characteristics desired, the process of the present invention can be carried out in 2 or more steps.

The following examples provide a better illustration of the present invention.

EXAMPLES

The following examples refer to tests carried out in a laboratory with 3 liter reactors which operate batchwise.

All the reagents are commercial products, the solvents and liquid activators were de-aerated under nitrogen and anhydrified on alumina or molecular sieves.

The copolymers obtained were characterized as follows:

Composition and Reactivity Ratio

These were determined by infra-red analysis of the polymer in the form of film with a thickness of 0.2 mm, using an FTIR spectrophotometer of Perkin Elmer model 1760.

The propylene content was determined by measuring the ratio between the band absorbances at 4390 and 4255 $cm^{-1}$ and using a calibration curve obtained with standard polymers.

Mooney Viscosity ML(1+4): this was determined at 100° C. and 125° C. according to the method ASTM D1646-87.

Molecular weight distribution ($M_w/M_n$).

This was determined with gel permeation chromatography, in 1,2-dichlorobenzene at 135° C., using 4 columns in series containing, as stationary phase, PL-GEL$^R$ (product of Polymer Lab) with particles of 10 m having a porosity of $10^2$, $10^3$, $10^4$, $10^5$ nm, respectively. The calculation of the molecular weights was corrected in relation to the average composition of the polymer according to the equation proposed by Sholte.

The melting heat correlated to the crystallinity of the polymers was determined by DSC with a Perkin-Elmer DSC7 instrument in an inert atmosphere and with a scanning rate of 20° C./min. The crystallinity datum was obtained by relating the melting heat of the polymer to the melting heat of the polyethylene estimated at 286 J/g.

The viscoelastic tests were carried out with a DMTA MKII mechanical dynamic analyzer of Polymer Lab, in shear mode at 130° C. in frequency scanning.

The intrinsic viscosity was determined in 1,2-dichlorobenzene at 135° C.

The catalyst used in experimental examples 1, 2 and 3 is a catalyst prepared according to the method indicated in example 10 of EP-A-751,155.

Comparative Example 1

(Copolymerisation of Ethylene and Propylene)

1675 ml of liquid propylene are charged into a perfectly anhydrous 2.8 $dm^3$ pressure-resistant reactor equipped with a propeller stirrer. The reactor is thermostat-regulated at 40° C., saturated with ethylene until an overpressure of 6.0 bars is reached, and a further overpressure of 0.2 bars of hydrogen is then added. The total pressure in the top of the reactor was 21.7 bars.

A hexane solution containing 1.76 mmoles of DEAC (Diethylaluminum chloride) is then added and subsequently an aliquot of the catalyst containing 0.039 mmoles of Vanadium suspended in hexane and 0.157 mmoles of ethyltrichloroacetate (ETCA, molar ratio Al/V=40, molar ratio ETCA/V=4).

The reaction is carried out for 60 minutes at a constant temperature feeding ethylene in continuous to keep the total pressure constant. At the end of this period the reactor was opened and 130 g of polymer in the form of agglomerated particles were recovered.

The characterizations of this polymer are shown in table 1.

EXAMPLE 2

(Copolymerization of Ethylene and Propylene)

1864 ml of liquid propylene are charged into the same reactor as example 1. The reactor is thermostat-regulated at 40° C. and saturated with ethylene until an overpressure of 5.55 bars is reached. The total pressure in the top of the reactor was 21.05 bars.

A hexane solution containing 1.56 mmoles of DEAC is then added and subsequently an aliquot of the catalyst containing 0.039 mmoles of Vanadium suspended in hexane and 0.118 mmoles of ETCA (molar ratio Al/V=40, molar ratio ETCA/V=3).

The reaction is carried out at a constant temperature feeding ethylene in continuous to keep the total pressure constant.

After 60 minutes the reaction was practically exhausted. The mixture was left under stirring for a few minutes, 3 bars of hydrogen were then added and the mixture was then saturated with a further 5 bars of ethylene (total ethylene pressure=10.55 bars).

A hexane solution containing 1.56 mmoles of DEAC and 0.118 mmoles of ETCA was then added to the reactor (total molar ratio Al/V=80, total molar ratio ETCA/V=6).

The polymerization restarted (ethylene consumption and exothermicity), and was carried out feeding ethylene to maintain the total pressure constant. After 60 minutes from the beginning of the second polymerization the monomers were evaporated and the reactor was opened. 128 grams of polymer in agglomerated particles were recovered.

The characterizations relating to this polymer are shown in table 1.

EXAMPLE 3

(Copolymerization of Ethylene and Propylene)

1864 ml of liquid propylene are charged into the reactor described above. The reactor is thermostat-regulated at 40° C. and saturated with ethylene until an overpressure of 6.1 bars is reached. The total pressure in the top of the reactor was 21.6 bars.

A hexane solution containing 2.65 mmoles of DEAC is then added and subsequently an aliquot of the catalyst containing 0.059 mmoles of Vanadium suspended in hexane and 0.176 mmoles of ETCA (molar ratio Al/V=45, molar ratio ETCA/V=3).

The reaction is carried out at a constant temperature feeding ethylene in continuous to keep the total pressure constant.

After 60 minutes the reaction was practically exhausted. The mixture was left under stirring for a few minutes and then 1 bar of hydrogen was added.

A hexane solution containing 2.36 mmoles of DEAC and 0.236 mmoles of ETCA was then added to the reactor (total molar ratio Al/V=85, total molar ratio ETCA/V=7).

The polymerization restarted (ethylene consumption and exothermicity), and was carried out feeding ethylene to maintain the total pressure constant. After 60 minutes from the beginning of the second polymerization the monomers were evaporated and the reactor was opened. 143 grams of polymer in agglomerated particles were recovered.

The characterizations relating to this polymer are shown in table 1.

EXAMPLES 4-6

These examples were carried out with the catalyst Vanadium (III) acetylacetonate (examples 4 and 5) and with the catalyst based on supported Vanadium (example 6). Owing to the rapid deactivation of V(III) acetylacetonate, in examples 4 and 5 the components of the catalytic system are fed in small portions.

In example 6 the Vanadium is introduced in a single portion together with the DEAC and the activator is then added.

Comparative Example 4

(Copolymerization of Ethylene and Propylene)

1925 ml of liquid propylene are charged into a perfectly anhydrous 2.8 dm$^3$ pressure-resistant reactor equipped with a propeller stirrer. The reactor is thermostat-regulated at 40° C. and saturated with ethylene until an overpressure of 4.0 bars is reached. The total pressure in the top of the reactor was 19.5 bars.

A hexane solution containing 4.22 mmoles of DEAC and a toluene solution of Vanadium (III) acetylacetonate containing 0.106 mmoles of Vanadium and 0.422 mmoles of ETCA are then charged into the reactor in small portions (total molar ratio Al/V=40, total molar ratio ETCA/V=4).

The reaction is carried out for 60 minutes at a constant temperature feeding ethylene in continuous to keep the total pressure constant. At the end of this period the reactor was opened and 176 g of polymer in the form of agglomerated particles were recovered.

The characterization relating to this polymer are shown in table 1.

EXAMPLE 5

(Copolymerization of Ethylene and Propylene)

1925 ml of liquid propylene are charged into the perfectly anhydrous pressure-resistant reactor described above. The reactor is thermostat-regulated at 40° C. and saturated with ethylene until an overpressure of 4.01 bars is reached. The total pressure in the top of the reactor was 19.5 bars.

A hexane solution containing 4.7 mmoles of DEAC and a toluene solution containing 0.118 mmoles of Vanadium (III) acetylacetonate and 0.47 mmoles of ETCA are then charged into the reactor in small portions (molar ratio Al/V=40, molar ratio ETCA/V=4).

The reaction is carried out at a constant temperature feeding ethylene in continuous to keep the total pressure constant.

After 60 minutes the reaction was practically exhausted. The mixture was left under stirring for a few minutes, 2 bars of hydrogen were then added and the mixture was saturated with a further 5 bars of ethylene (total ethylene pressure 6.51 bars).

A hexane solution containing 4.7 mmoles of DEAC and 0.47 mmoles of ETCA was then added to the reactor (total molar ratio Al/V=80, total molar ratio ETCA/V=8).

The characterizations relating to this polymer are shown in table 1.

EXAMPLES 6-7

In these examples a catalyst was used, prepared according to EP-A-717,050 of the same applicant, prepared with the same procedure as experimental example 6.

Comparative Example 6

(Copolymerization of Ethylene and Propylene)

1675 ml of liquid propylene are charged into a perfectly anhydrous 2.8 dm$^3$ pressure-resistant reactor equipped with a propeller stirrer. The reactor is thermostat-regulated at 40° C., saturated with ethylene until an overpressure of 6.0 bars is reached, and then a further overpressure of 0.1 bars of hydrogen was added. The total pressure in the top of the reactor was 21.6 bars.

A hexane solution containing 4.32 mmoles of DEAC and subsequently an aliquot of the catalyst containing 0.086 mmoles of Vanadium suspended in hexane and 0.69 mmoles of ETCA are then charged into the reactor (molar ratio Al/V=50, molar ratio ETCA/V=8).

The reaction is carried out for 60 minutes at a constant temperature feeding ethylene in continuous to keep the total pressure constant. At the end of this period the reactor was opened and 124 g of polymer in the form of agglomerated particles were recovered.

The characterization relating to this polymer are shown in table 1.

EXAMPLE 7

(Copolymerization of Ethylene and Propylene)

1925 ml of liquid propylene are charged into a perfectly anhydrous 2.8 dm$^3$ reactor equipped with a propeller stirrer. The reactor is thermostat-regulated at 40° C. and saturated with ethylene until an overpressure of 4 bars is reached. The total pressure in the top of the reactor was 19.4 bars.

A hexane solution containing 2.74 mmoles of DEAC is then added and subsequently an aliquot of the catalyst containing 0.068 mmoles of Vanadium suspended in hexane and 0.274 mmoles of ETCA (molar ratio Al/V=40, molar ratio ETCA/V=4).

The reaction is carried out at a constant temperature feeding ethylene in continuous to keep the total pressure constant.

After 60 minutes the reaction was practically exhausted. The mixture was left under stirring for a few minutes, 2 bars of hydrogen were then added and the mixture was then saturated with a further 2.5 bars of ethylene (total ethylene pressure=6.5 bars).

A hexane solution containing 2.74 mmoles of DEAC and 0.274 mmoles of ETCA was then added to the reactor (total molar ratio Al/V=80, total molar ratio ETCA/V=8).

The polymerization restarted (ethylene consumption and exothermicity), and was carried out feeding ethylene to maintain the total pressure constant. After 60 minutes from the beginning of the second polymerization the monomers were evaporated and the reactor was opened. 192 grams of polymer in agglomerated particles were recovered.

The characterization relating to this polymer are shown in table 1.

TABLE 1

| Ex. | Nr. steps | Prop. weight % | ML 125° C. | [η] ODCB | Yield Kg/gV | Cryst. PE % | MWD Mw/Mn |
| --- | --- | --- | --- | --- | --- | --- | --- |
| 1c | 1 | 39.1 | 59 | 2.2 | 66 | 2.4 | 5.2 |
| 2 | 2 | 39.6 | 48 | 2.35 | 64 | 5.2 | 49.4 |
| 3 | 2 | 41.6 | 55 | 3.5 | 48 | 2.5 | 61.8 |
| 4c | 1 | 43.6 | 133 | 2.8 | 33 | 0.7 | 2.6 |
| 5 | 2 | 42.2 | 114 | 2.75 | 51 | 2.0 | 4.5 |
| 6c | 1 | 38.5 | 67 | 2.33 | 28 | 1.15 | 2.4 |
| 7 | 2 | 38.4 | 50 | 2.75 | 55 | 5.2 | 20.7 |

From the data of table 1, the wider molecular weight distribution which can be obtained with the process of the present invention is evident.

In order to give an evaluation of the processability of the polymer of example 2 with respect to the polymer of comparative example 1, the viscoelastic properties were studied (FIG. 1) in relation to the frequency of mechanical impulses received: the different behavior of the sample relating to example 2, which at high frequency (corresponding to shears typical of processing and particularly extrusion) shows a much more marked drop in vicosity with respect to the comparative sample, can be distinctly observed.

I claim:

1. A process of at least two steps for the preparation in suspension of a mixture of ethylene-propylene (EPM) elastomer copolymers or a mixture of ethylene-propylene-diene (EPDM) elastomer terpolymers comprising the steps of:

a) polymerizing in a first step monomers for the first step in the presence of a catalyst of Vanadium, a cocatalyst and optionally an activator to a conversion degree of at least 1,000 grams of polymer per gram of Vanadium;

wherein said catalyst of Vanadium is consists essentially of a compound of Vanadium or a compound of Vanadium supported on an inert carrier;

wherein said cocatalyst consists essentially of an Aluminum alkyl having the formula;

where R is a $C_1$–$C_{20}$ alkyl radical, X is a halogen, m+n=3, m is an integer from 0 to 2; and wherein the molar ratio of cocatalyst/Vanadium is from 5 to 500; and obtaining a polymer suspension in a liquid phase;

b) admixing with said polymer suspension obtained in step (a) monomers for step (b) and polymerizing said monomers for step (b) in a second or subsequent steps together with further activator in order to have a molar ratio between activator, sum of the optional activator of step (a) and the activator of step (b), and Vanadium of from 4 to 50; and with further cocatalyst so as to have a ratio between the cocatalyst of step (b) and Vanadium of step (a) of from 5 to 500; wherein a polymerization reaction is continued up to a conversion of at least 3000 grams of polymer per gram of catalyst.

2. The process according to claim 1, wherein the catalyst of Vanadium is selected from supported and/or prepolymerized catalysts based on Vanadium; Vanadyl trihalides, alkoxyhalides and alkoxides; Vanadium and Vanadyl acetylacetonates and chloro acetylacetonates.

3. The process according to claim 1, wherein the molar ratio cocatalyst/Vanadium in step (a) is from 7 to 50.

4. The process according to claim 1, wherein the ratio between the cocatalyst of step (b) and Vanadium of step (a) is from 7 to 50.

5. The process according to claim 1, wherein in step (a) the molar ratio between activator and Vanadium is between 1 and 10.

6. The process according to claim 5, wherein in step (a) the molar ratio between activator and Vanadium is between 2 and 5.

7. The process according to claim 1, wherein in steps (a) and (b) the polymerization temperature is from 15° C. to 65° C. and the pressure is from 8 to 80 bars.

8. The process according to claim 7, wherein the temperature is from 25° C. to 50° C. and the pressure from 12 to 40 bars.

9. The process according to claim 1, wherein steps (a) and (b) are both carried out in the presence of a molecular weight regulator.

10. The process according to claim 1, wherein step (a) is carried out without a molecular weight regulator, which is used however in step (b).

11. The process according to claim 9, wherein the molecular weight regulator is hydrogen.

12. The process according to claim 1, wherein the reaction medium consists of the same polymerizable monomers present in liquid phase.

13. The process according to claim 1, wherein the reaction medium consists of polymerizable monomers present in liquid phase, diluted with a saturated hydrocarbon.

14. The process according to claim 1, wherein the number of steps is 2.

15. The process of claim 13, wherein said saturated hydrocarbon is propane.

* * * * *